US010861111B2

(12) United States Patent
Chawla

(10) Patent No.: US 10,861,111 B2
(45) Date of Patent: Dec. 8, 2020

(54) DISTRIBUTED SYSTEMS, DEVICES AND METHODS FOR DISPENSING FUEL

(71) Applicant: Walmart Apollo, LLC, Bentonville, AR (US)

(72) Inventor: Vikram Chawla, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 843 days.

(21) Appl. No.: 15/222,154

(22) Filed: Jul. 28, 2016

(65) Prior Publication Data
US 2017/0032475 A1 Feb. 2, 2017

Related U.S. Application Data

(60) Provisional application No. 62/199,692, filed on Jul. 31, 2015.

(51) Int. Cl.
*G06Q 20/38* (2012.01)
*G06Q 50/06* (2012.01)
*G06K 7/14* (2006.01)
*G06Q 20/20* (2012.01)
*G06Q 20/18* (2012.01)
*G06Q 20/40* (2012.01)

(52) U.S. Cl.
CPC .......... *G06Q 50/06* (2013.01); *G06K 7/1408* (2013.01); *G06Q 20/18* (2013.01); *G06Q 20/204* (2013.01); *G06Q 20/385* (2013.01); *G06Q 20/4012* (2013.01)

(58) Field of Classification Search
CPC ................................................. G06Q 20/322
USPC ........................................................ 705/75
See application file for complete search history.

(56) References Cited

U.S. PATENT DOCUMENTS

| 6,535,726 B1 * | 3/2003 | Johnson | G06Q 20/04 235/381 |
|---|---|---|---|
| 7,376,584 B1 | 5/2008 | Weixel | |
| 8,185,449 B2 | 5/2012 | Ward | |
| 8,700,484 B2 | 4/2014 | Senior | |
| (Continued) | | | |

OTHER PUBLICATIONS

Mixed Fleet Operations: Fleet Operators Are Not All the Same, 6 pages, downloaded from http://www.thefuelcardpeople.co.uk/mixed-fleet-operations/, accessed on Oct. 25, 2016.

*Primary Examiner* — Chinedu C Agwumezie
(74) *Attorney, Agent, or Firm* — McCarter & English, LLP

(57) ABSTRACT

Methodologies, systems, and computer-readable media are provided for generating redeemable electronic fuel codes and validating fuel payments at a fuel point of sale terminal. An enterprise can be configured to receive an indication of fuel purchase request and can request authorization from a financial institution or account associated with at least one individual. If the payment is authorized, the enterprise can generate a purchase authorization for the amount of fuel requested and create an encrypted electronic fuel code that can be transmitted to the individual and used for redeeming fuel at a fuel point of sale terminal associated with the enterprise. An enterprise can be configured to sell fuel to at least one individual using a phone number and a unique security PIN at a fuel point of sale terminal, such that the at least one individual is billed for the fuel purchase via their phone service provider.

10 Claims, 5 Drawing Sheets

(56) References Cited

U.S. PATENT DOCUMENTS

| | | |
|---|---|---|
| 2005/0149402 A1 | 7/2005 | Nicholson |
| 2009/0070254 A1 | 3/2009 | Thrush |
| 2009/0307098 A1 | 12/2009 | Verona |
| 2011/0099055 A1 | 4/2011 | Khalil |
| 2013/0198074 A1 | 8/2013 | Cox et al. |
| 2014/0114467 A1* | 4/2014 | Zimmerman .......... G06Q 10/08 700/216 |
| 2014/0222595 A1* | 8/2014 | Fernandes .............. G06Q 20/20 705/16 |

* cited by examiner

DISTRIBUTED SYSTEMS, DEVICES AND METHODS FOR DISPENSING FUEL

RELATED APPLICATIONS

This application claims priority to U.S. Provisional Patent Application Ser. No. 62/199,692 entitled "SYSTEMS, DEVICES, AND METHODS FOR GENERATING REDEEMABLE ELECTRONIC FUEL CODES," filed on Jul. 31, 2015, the content of which is hereby incorporated by reference in its entirety.

BACKGROUND OF THE TECHNOLOGY

In general, individuals wishing to purchase fuel must do so at a filling station using a tender instrument at the time of purchase. Certain existing techniques allow individuals to purchase fuel at filling stations associated with a retail enterprise.

SUMMARY

Exemplary embodiments of the present disclosure provide systems, devices, and methods for generating redeemable electronic fuel codes and for validating fuel payment at a fuel point of sale terminal.

In accordance with some examples of the present disclosure, a method of generating redeemable electronic fuel codes is disclosed. The method includes receiving, at a processor associated with an enterprise, in an electronic computer readable format, data indicative of a request by a user to purchase an amount of fuel. The method also includes receiving authorization of a payment amount corresponding to the amount of fuel requested. The amount of fuel can be determine, at least in part, based on an amount the individual intends to spend, as well as the grade of fuel selected. For example, the amount of fuel may be less if an individual selects a premium grade fuel rather than regular grade fuel for a given payment amount. The method also includes generating, in response to receiving authorization of the payment amount, a purchase authorization for the purchase of the amount of fuel requested. The method also includes encrypting the purchase authorization to create an electronic fuel code redeemable at a fuel point of sale terminal associated with the enterprise. The method also includes transmitting the electronic fuel code to an electronic device associated with the user. In some examples, the machine-readable electronic fuel code includes a barcode or a quick response code. In some examples, the method further includes receive, at the processor associated with the enterprise, data indicative of scanning of the electronic fuel code at a fuel point of sale terminal associated with the enterprise; and transmitting a redemption authorization to cause the dispensing of an amount of fuel associated with the electronic fuel code. In some examples, receiving data indicative of the scanning of the electronic fuel code includes receiving data indicative of use of an optical scanning device at the fuel point of sale terminal to scan the electronic fuel code. In some examples, transmitting the electronic fuel code to an electronic device associated with the user includes transmitting the electronic fuel code via email, a short message service, or an instant messenger service. In some examples, receiving data indicative of a request to purchase an amount of fuel includes receiving, through an online retailer a request to purchase an amount of fuel. In some examples, transmitting the electronic fuel code to the electronic device associated with the user includes transmitting the electronic fuel code to the electronic device associated with the user through the online retailer, the online retailer being distinct from the enterprise generating the electronic fuel code. In some examples, the payment amount corresponding to the amount of fuel requested adds sufficient value to an online purchase to qualify the user for a shopping benefit.

In accordance with other examples of the present disclosure, a method of validating fuel payment at a fuel point of sale terminal is disclosed. The method includes transmitting a unique security PIN associated with an individual's phone number to an electronic device associated with the individual. The unique security PIN can be transmitted to the individual prior to initiating a fuel purchase and prior to the individual approaching or interacting with the fuel point of sale terminal. The method also includes receiving, at a fuel point of sale terminal, a phone number from at least one individual. The method also includes receiving at the fuel point of sale terminal, the security PIN from the at least one individual. The method also includes receiving validation at the fuel point of sale terminal of the phone number and security PIN. The method also includes issuing a command to cause the dispensing of the fuel to the at least one individual at the fuel point of sale terminal in response to validation of the phone number and security PIN. The method also includes requesting payment of the fuel purchase from a phone service provider associated with the phone number after dispensing fuel to the at least one individual. The method also includes receiving an indication of payment of the fuel purchase from the phone service provider. The method also includes recording the phone number, a fuel point of sale terminal identification number, and a time stamp for the fuel purchase. In some examples, the method also includes encrypting the security PIN prior to transmitting the security PIN to the electronic device associated with the at least one individual. In some examples, the security PIN is a temporary software token configured to expire after a predetermined time period. In some examples, a single security PIN may be used by more than one individual and/or family members of the individual(s) associated with the phone number.

Any combination or permutation of the above examples is envisioned. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present disclosure will be more fully understood from the following description of exemplary embodiments when read together with the accompanying drawings, in which.

DETAILED DESCRIPTION

Figure 1:
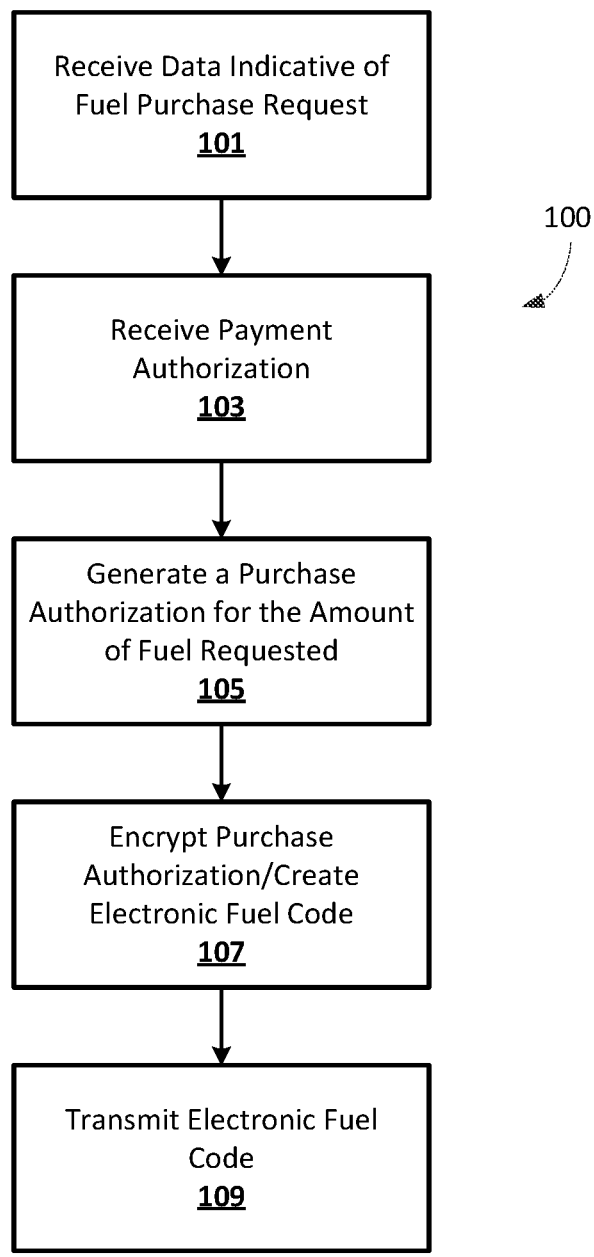
FIG. 1 is a flowchart illustrating an exemplary method of generating a redeemable electronic fuel code, according to embodiments of the present disclosure.

Following below are more detailed descriptions of various concepts related to, and embodiments of, inventive methods, apparatus, and systems for generating redeemable electronic fuel codes and validating fuel payments. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

Example methodologies, systems, apparatus, and non-transitory computer-readable media are described herein to facilitate generating redeemable electronic fuel codes and validating fuel payments at a fuel point of sale terminal. Some example implementations involve facilitating the sale of fuel online by generating and transmitting the redeemable electronic fuel codes to at least one individual. Other example implementations involve validating fuel purchases through a user's phone service provider.

In one example, a server associated with the enterprise is configured to receive, for example via an Application Programming Interface (API) hosted on an enterprise server, a request to purchase fuel from an online vendor. In some examples, the online vendor is the enterprise's own online marketplace, while in other examples it may be a third-party online vendor. The enterprise is configured to request the appropriate funds from a financial institution or account associated with the at least one individual. If the payment is authorized, the enterprise generates a purchase authorization for the amount of fuel requested. This purchase authorization is encrypted to create an electronic fuel code. The electronic fuel code is configured such that it can be used for redeeming fuel at a fuel point of sale terminal associated with the enterprise.

In an example implementation, the redeemable electronic fuel codes are used to facilitate the sale of fuel through an online platform. In such an example, at least one individual can use a purchase value associated with the redeemable electronic fuel codes to increase the total checkout value of an online purchase in order to qualify for free shipping, or some other online shopping benefit provided by vendors. Using the redeemable electronic fuel codes, a user can also purchase gasoline at a point of sale terminal or electronic kiosk within an enterprise. The redeemable electronic fuel code can be printed or transmitted to an electronic device associated with the user. This redeemable electronic fuel code can be scanned at a fuel point of sale terminal, or filling station, and redeemed for fuel. The redeemable electronic fuel code can be printed or displayed via a smartphone or electronic device, in some examples. The electronic fuel code can be transmitted, for example, through a third-party online vendor, via email, or some other suitable electronic messenger system. Once the at least one individual has received the electronic fuel code, it may be scanned at the fuel point of sale terminal to cause the dispensing of the appropriate or desired amount of fuel. If the desired amount of fuel is less than the amount corresponding to the electronic fuel code, the code may be reused at any time to redeem the remaining amount.

Another aspect of the present disclosure relates to a method of validating fuel payment at a fuel point of sale terminal using at least one individual's phone number and a unique security PIN. Implementation of the method eliminates the need for at least one individual to produce a tender instrument, such as a debit or credit card, at the fuel point of sale terminal in order to purchase fuel. In an example implementation, an example system herein can be configured to generate a unique security PIN and transmit the PIN to an electronic device associated with the at least one individual. The uniquely generated security PIN can be an electronic security token configured to expire after a certain time period, such that a fuel purchase request may be cancelled if it is not verified within a specified time period. The unique security PIN can also be an encrypted PIN, or a password setup by the at least one individual prior to initiating a fuel purchase request, in some examples. A fuel point of sale terminal or a filling station associated with an enterprise can be configured to prompt at least one individual to enter a phone number at a keypad or user interface in order to initiate a fuel purchase request. The fuel point of sale terminal or a filling station associated with an enterprise can also be configured to prompt the at least one individual to enter the security PIN for validation and authorize the release of an amount of fuel once the phone number and PIN are validated, such that the at least one individual can begin pumping gas. An example system herein can provide instructions to cause the fuel point of sale terminal or the enterprise to request payment of the fuel purchase from the phone service provider associated with the phone number. The amount to be charged for the fuel purchase can be added to the at least one individual's phone bill. In some examples, the fuel point of sale terminal is IP addressable and can send a dollar amount, along with the appropriate phone number to the phone service provider. The charge could be applied to the at least one individual dynamically, or collected until a monthly or periodic bill is applied.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

FIG. 1 is a flowchart illustrating an example method 100 for generating redeemable electronic fuel codes. In step 101, data indicative of a request by a user to purchase an amount of fuel is received at a processor associated with an enterprise. The data is received in an electronic computer-readable format, and identifies the amount of fuel at least one individual wishes to purchase. In some examples, receiving data indicative of a request to purchase an amount of fuel includes receiving a request to purchase the amount of fuel through an online retailer. The online retailer may be an online store or marketplace associated with the enterprise, or a separate online store or marketplace authorized to sell goods or services on behalf of the enterprise. For example, if a user wishes to purchase fuel from the enterprise through a third party online marketplace or retailer, the user may enter the amount of fuel or dollar amount desired, payment information, etc. via the online retailer's website. The enterprise then receives data indicative of the user's purchase request in order to proceed with generating a redeemable electronic fuel code. The data indicative of a request to purchase fuel can be received via an API hosted by the enterprise, in some examples.

In step 103, the enterprise receives authorization of a payment amount corresponding to the amount of fuel requested. The authorization may be received from a financial institution, for example, and the payment amount can be added to an online purchase. In some examples, the payment amount adds sufficient value to an online purchase to qualify the user for a shopping benefit, such as free shipping on an online order.

In step 105, a purchase authorization is generated for the purchase of the amount of fuel requested, in response to receiving authorization of the payment amount. The purchase authorization can be generated at the enterprise in response to receiving an authorization of the payment amount from a financial institution or account associated with the at least one individual.

In step 107, the purchase authorization is encrypted to create an electronic fuel code that can be redeemable at a fuel point of sale terminal associated with the enterprise. The fuel point of sale terminal can include, for example, a payment terminal or kiosk associated with a fuel pump or filling station. In some examples, the electronic fuel code can include a barcode, quick response code, or any other suitable machine-readable code.

In step 109, the electronic fuel code is transmitted to an electronic device associated with the user or customer. The electronic fuel code can be transmitted to the user via email, a short message service (SMS), an instant messenger service, or any other suitable electronic messenger service. In some examples, where a request to purchase an amount of fuel is received through an online retailer, the electronic fuel code can be transmitted to the electronic device associated with the user through the online retailer. The online retailer may be distinct from the enterprise responsible for generating the electronic fuel code.

Figure 2:
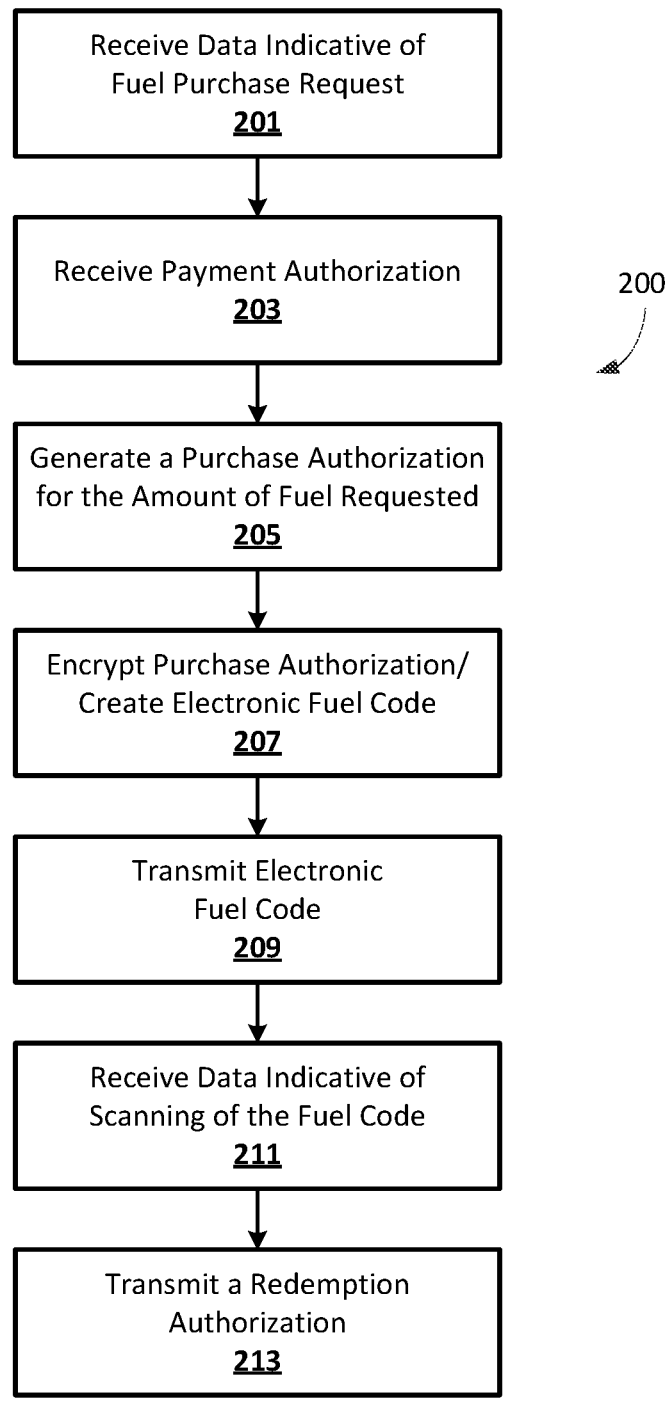
FIG. 2 is a flowchart illustrating another exemplary method of generating a redeemable electronic fuel code, according to embodiments of the present disclosure.

FIG. 2 is a flowchart illustrating another example method 200 for generating redeemable electronic fuel codes. In step 201, data indicative of a request by a user to purchase an amount of fuel is received at a processor associated with an enterprise. The data is received in an electronic computer-readable format, and identifies the amount of fuel at least one individual wishes to purchase. In some examples, receiving data indicative of a request to purchase an amount of fuel includes receiving a request to purchase the amount of fuel through an online retailer. The online retailer may be an online store or marketplace associated with the enterprise, or a separate online store or marketplace authorized to sell goods or services on behalf of the enterprise. For example, if a user wishes to purchase fuel from the enterprise through a third party online marketplace or retailer, the user may enter the amount of fuel desired, payment information, etc. via the online retailer's website. The enterprise then receives data indicative of the user's purchase request in order to proceed with generating a redeemable electronic fuel code. The data indicative of a request to purchase fuel can be received via an API hosted by the enterprise, in some examples.

In step 203, the enterprise receives authorization of a payment amount corresponding to the amount of fuel requested. The authorization may be received from a financial institution, for example, and the payment amount can be added to an online purchase. In some examples, the payment amount adds sufficient value to an online purchase to qualify the user for a shopping benefit, such as free shipping on an online order.

In step 205, a purchase authorization is generated for the purchase of the amount of fuel requested, in response to receiving authorization of the payment amount. The purchase authorization can be generated at the enterprise in response to receiving an authorization of the payment amount from a financial institution or account associated with the at least one individual.

In step 207, the purchase authorization is encrypted to create an electronic fuel code that can be redeemable at a fuel point of sale terminal associated with the enterprise. The fuel point of sale terminal can include, for example, a payment terminal or kiosk associated with a fuel pump or filling station. In some examples, the electronic fuel code can include a barcode, quick response code, or any other suitable machine-readable code.

In step 209, the electronic fuel code is transmitted to an electronic device associated with the user or customer. The electronic fuel code can be transmitted to the user via email, a short message service (SMS), an instant messenger service, or any other suitable electronic messenger service. In some examples, where a request to purchase an amount of fuel is received through an online retailer, the electronic fuel code can be transmitted to the electronic device associated with the user through the online retailer. The online retailer may be distinct from the enterprise responsible for generating the electronic fuel code.

In step 211, data indicative of scanning of the electronic fuel code at a fuel point of sale terminal is received at a processor associated with the enterprise. Scanning of the electronic fuel code may be completed, in some examples, using a scanning device associated with the fuel point of sale terminal or gas station. A suitable scanning device may include, for example, an optical scanning device, infrared scanning device, or any other suitable user-machine interface device regardless of mobility or form factor. A user can scan a printed electronic fuel code or a code displayed on a mobile electronic device, in some examples.

In response to receiving the data indicative of scanning of the electronic fuel code, a redemption authorization is transmitted in step 213 to cause the dispensing of an amount of fuel associated with the electronic fuel code.

Figure 3:
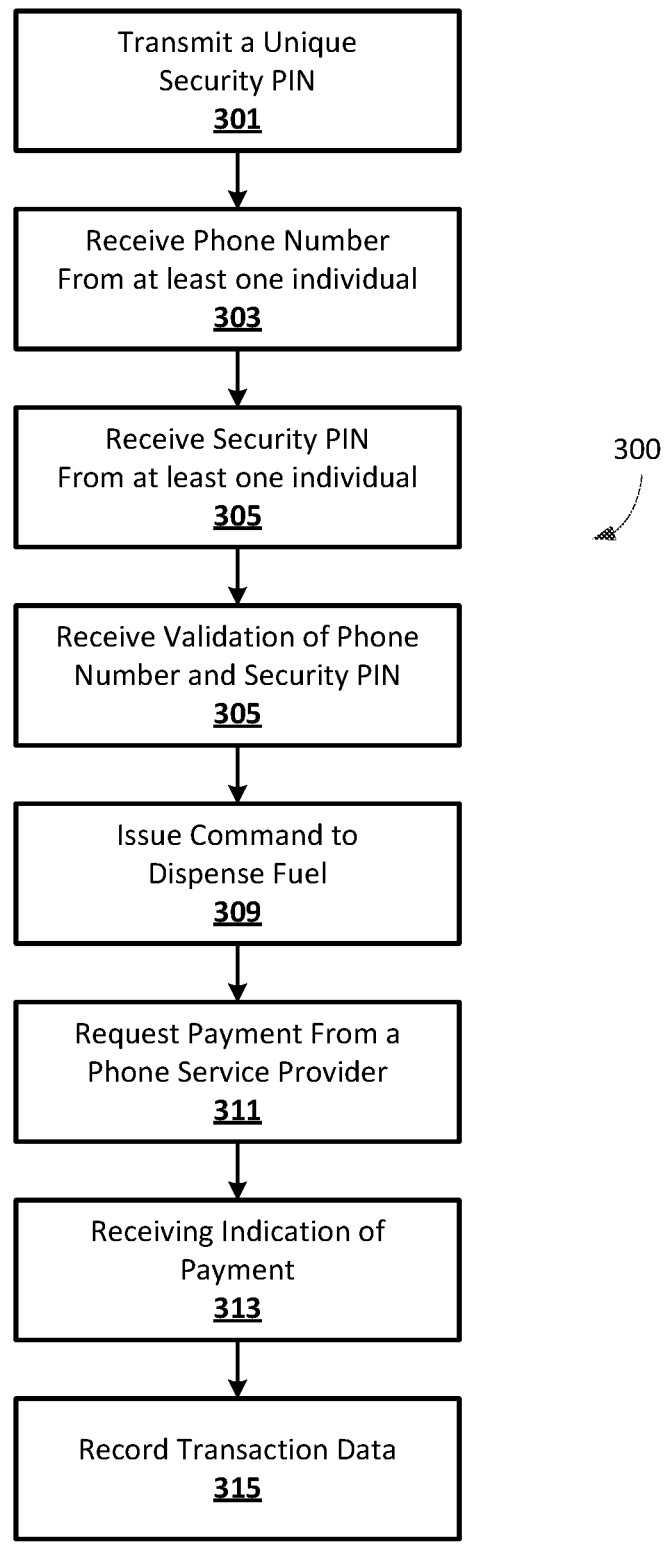
FIG. 3 is a flowchart illustrating an exemplary method of validating fuel payment at a fuel point of sale terminal, according to embodiments of the present disclosure.

FIG. 3 is a flowchart illustrating an example method 300 for validating fuel payment at a fuel point of sale terminal. In step 301, a unique security PIN associated with the at least one individual's phone number is transmitted to an electronic device associated with the at least one individual. In some examples, the unique security PIN is encrypted prior to transmittal to the at least one individual's electronic device. The security PIN may include, for example, a PIN or password setup by the at least one individual prior to initiating a fuel purchase, or a temporary software token configured to expire after a predetermined time period.

In step 303, a phone number is received from at least one individual at a fuel point of sale terminal. In some examples, the phone number can be manually entered by the at least one individual at a fuel point of sale terminal via a keypad or other user-machine interface associated with the terminal. In some embodiments, the fuel point of sale terminal includes a graphical user interface with a physical or touchscreen keypad.

Once the phone number has been received in step 303, the unique security PIN is received from the at least one individual at the fuel point of sale terminal in step 305. In some examples, the unique security PIN can be received via a keypad or other user-machine interface associated with a fuel point of sale terminal or a gas station.

In step 307, validation is received at the fuel point of sale terminal of the phone number and security PIN. In response to the validation of the phone number and security PIN that is received in step 307, a command is issued in step 309 to cause the dispensing of the fuel to the at least one individual at the fuel point of sale terminal.

In step 311, payment of the fuel purchase is requested from a phone service provider associated with the phone number. In some examples, the enterprise may establish an agreement with the phone service provider in order to offer the fuel payment validation services described herein. The payment of the fuel purchase can be requested after dispensing the fuel to the at least one individual, in some examples.

In step 313, an indication of the payment of the fuel purchase is received from the phone service provider. In step 315, the phone number, fuel point of sale terminal identification number, time stamp for the fuel purchase, and any other suitable transaction is recorded. In some examples, the transaction data can be stored in a database and may be provided as a receipt to the at least one individual or the phone service provider.

Figure 4:
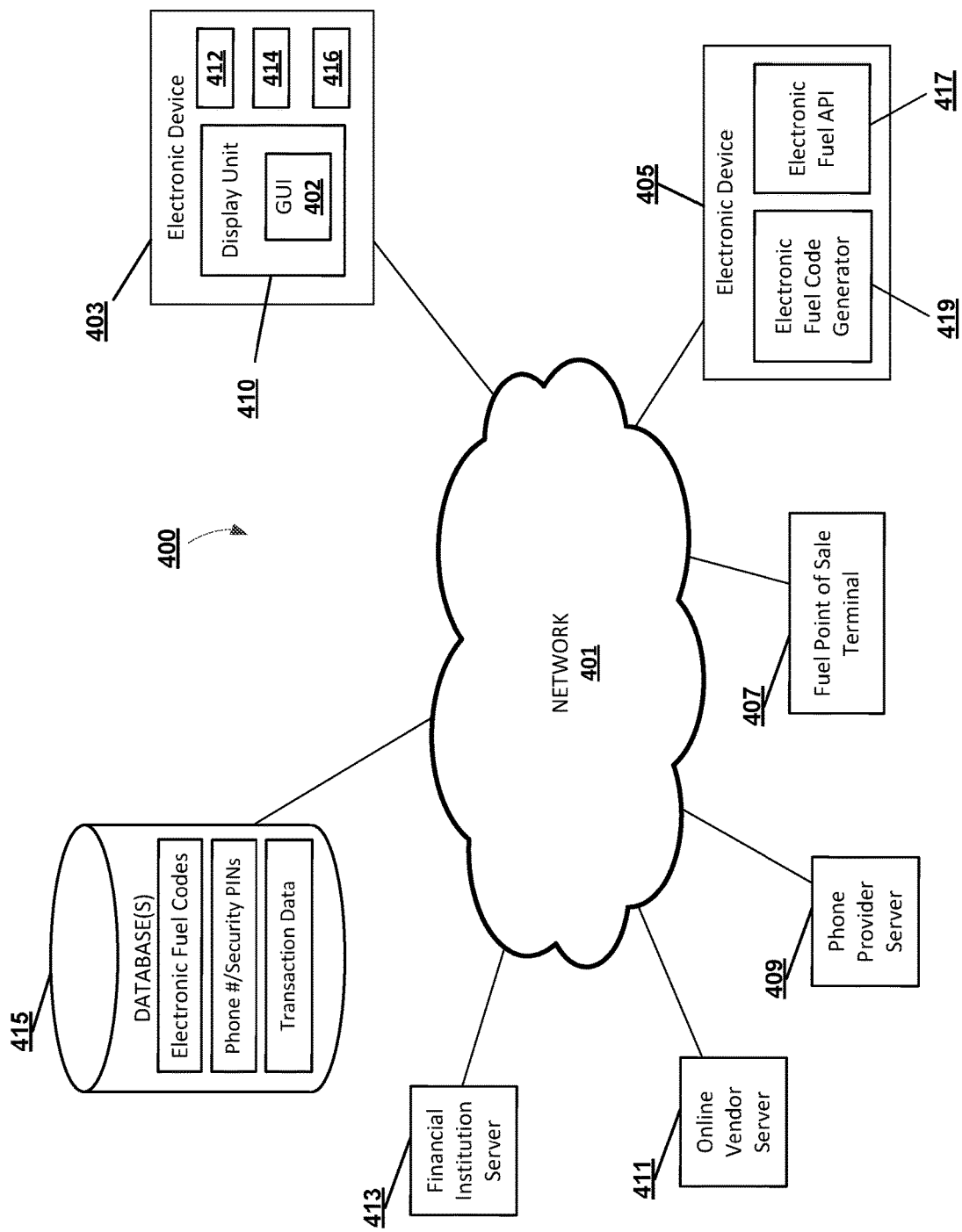
FIG. 4 is a diagram of an exemplary network environment suitable for a distributed implementation of exemplary embodiments of the present disclosure.

FIG. 4 illustrates a network diagram depicting a system 400 suitable for a distributed implementation of exemplary embodiments. The system 400 can include a network 401, enterprise server 405, fuel point of sale terminal 407, phone provider server 409, online vendor server 411, financial institution server 413, database 415, and electronic device 403. As will be appreciated, various distributed or centralized configurations may be implemented, and in some embodiments a single server can be used. In exemplary embodiments, the database 511 can store the various electronic fuel codes, phone number and security PINs, and fuel transaction data, while the enterprise server can store an electronic fuel API 417, and electronic fuel code generator 419, which can implement one or more of the processes described herein with respect to FIGS. 1-3. In other examples, the electronic fuel codes can be generated on the fly using the electronic fuel API 417. Each electronic fuel code can be uniquely marked using, for example, an amount of fuel, dollar amount, timestamp, etc. In some examples, the enterprise server 405 and/or fuel point of sale terminal 407 can communicate with the phone provider server 409 to request payment of a fuel purchase, the online vendor server 411 to receive data indicative of a request for an amount of fuel, or a financial institution server 413 to request payment authorization for the amount of fuel requested.

The network environment may also include an electronic device 403, that may display a GUI 402 to a user such that a user can request to purchase fuel. In some examples, the fuel point of sale terminal 407 or the enterprise server 405 can transmit the electronic fuel code, generated via the electronic fuel code generator 419, to a user via the electronic device 403. The device 403 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, tablets, netbooks, and the like. The device 403 may include some or all components described in relation to visual display device 503 shown in FIG. 5.

In some embodiments, the fuel point of sale terminal 407 is a point of sale (POS) system. In this case, the device 407 may comprise, but is not limited to, cash registers, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, smartphones, tablets, netbooks, and the like. The device 407, being a POS system, can be part of a store infrastructure and aid in performing various transactions related to fuel sales and other aspects of a store. Being part of a store's infrastructure, the device 407 may be installed within the store or may be installed or operational outside of the store. For example, the device 407 may be a mobile device that a store employee can use outside of the store to perform transactions or other activities. In another example, the device 407 may be a kiosk installed outside the store. Similarly, the device 407 may be a mobile device that can be used within the store, and is not physically installed or attached to one particular location within the store. The device 407 may also include various external or peripheral devices to aid in performing sales transactions and other duties. Examples of peripheral devices include, but are not limited to, barcode scanners, cash drawers, monitors, touch-screen monitors, clicking devices (e.g., mouse), input devices (e.g., keyboard), receipt printers, coupon printers, payment terminals, and the like. Examples of payment terminals include, but are not limited to, card readers, pin pads, signature pads, signature pens, Square™ registers, LevelUp™ platform, cash or change deposit devices, cash or change dispensing devices, coupon accepting devices, and the like. The device 407 may connect to network 401 via a wired or wireless connection. The device 407 may include one or more applications such as, but not limited to, a web browser, a sales transaction application, a card reader application, cash deposit system, and the like.

In exemplary embodiments, the servers 405, 409, 411, and 413, database 415, fuel point of sale terminal 407, and the electronic device 403 may be in communication with each other via a communication network 401. The communication network 401 may include, but is not limited to, the Internet, an intranet, a LAN (Local Area Network), a WAN (Wide Area Network), a MAN (Metropolitan Area Network), a wireless network, an optical network, and the like. In exemplary embodiments, the electronic device 403, enterprise server 405, or fuel point of sale terminal 407 are in communication with the servers 409, 411, and 413 and database 415 and can generate and transmit database queries requesting information from the servers 409, 411, 413, and raw data matrices or database 415. The one or more servers 405, 409, 411, and 413 can transmit instructions to the electronic device 403 and/or fuel point of sale terminal 407 over the communication network 401. In exemplary embodiments, the electronic fuel codes, phone numbers, unique security PINs, transaction data, etc. can be stored at database 415 and received at the enterprise server 405 or fuel point of sale terminal 407 in order to validate a fuel purchase.

Figure 5:
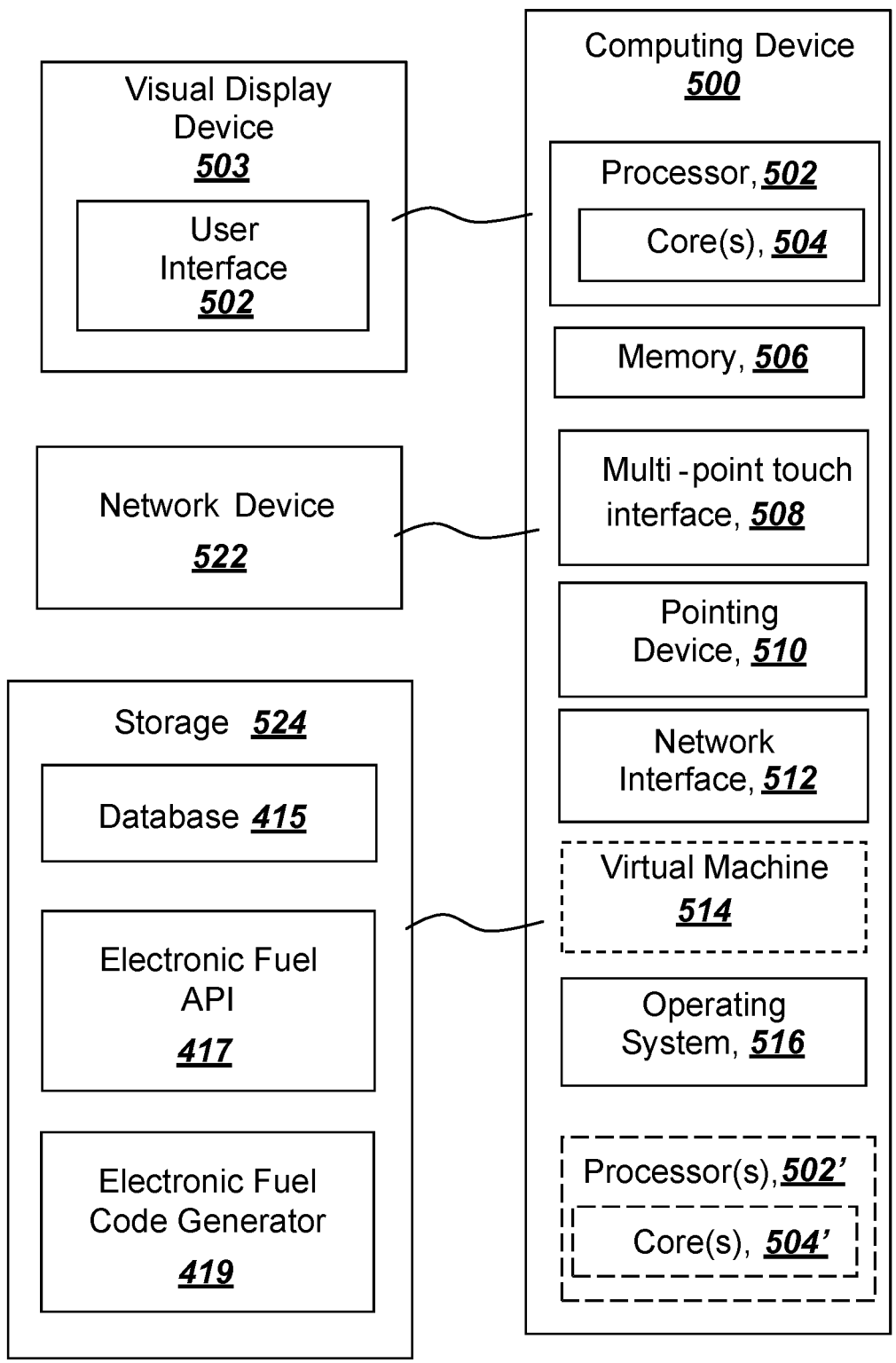
FIG. 5 is a block diagram of an exemplary computing device that can be used to perform exemplary processes in accordance with exemplary embodiments of the present disclosure.

FIG. 5 is a block diagram of an exemplary computing device 500 that can be used in the performance of any of the example methods according to the principles described herein. The computing device 500 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 506 included in the computing device 500 can store computer-readable and computer-executable instructions or software for implementing exemplary embodiments, such as an electronic fuel API 417, and/or electronic fuel code generator 419 associated with embodiments of the present disclosure and programmed to perform processes described herein. The computing device 500 also includes processor 502 and associated core 504, and optionally, one or more additional processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' can each be a single core processor or multiple core (504 and 504') processor.

Virtualization can be employed in the computing device 500 so that infrastructure and resources in the computing device can be shared dynamically. A virtual machine 514 can be provided to handle a process running on multiple processors so that the process appears to be using only one computing resource rather than multiple computing resources. Multiple virtual machines can also be used with one processor.

Memory 506 can be non-transitory computer-readable media including a computer system memory or random access memory, such as DRAM, SRAM, EDO RAM, and the like. Memory 506 can include other types of memory as well, or combinations thereof.

A user can interact with the computing device 500 through a visual display device 503, such as a touch screen display or computer monitor, which can display one or more user interfaces 504 that can be provided in accordance with exemplary embodiments. The computing device 500 can include other I/O devices for receiving input from a user, for example, a keyboard or any suitable multi-point touch interface 508, a pointing device 510 (e.g., a pen, stylus, mouse, or trackpad). The keyboard 508 and the pointing device 510 can be coupled to the visual display device 503. The computing device 500 can include other suitable conventional I/O peripherals.

The computing device 500 can also include one or more storage devices 524, such as a hard-drive, CD-ROM, or other non-transitory computer readable media, for storing data and computer-readable instructions and/or software, such as an electronic fuel API 417, and/or electronic fuel code generator 419 that implements exemplary embodiments of the methods and systems as taught herein, or portions thereof. Exemplary storage device 524 can also store one or more databases 415 for storing any suitable information required to implement exemplary embodiments. The databases can be updated by a user or automatically at any suitable time to add, delete or update one or more items in the databases. Exemplary storage device 524 can store one or more databases 415 for storing electronic fuel codes, phone numbers, security PINs, transaction data, and any other data/information used to implement exemplary embodiments of the systems and methods described herein.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 can include a built-in network adapter, network interface card, PCMCIA network card, card bus network adapter, wireless network adapter, USB network adapter, modem or any other device suitable for interfacing the computing device 500 to any type of network capable of communication and performing the operations described herein.

Moreover, the computing device 500 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 500 can run any operating system 516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 516 can be run in native mode or emulated mode. In an exemplary embodiment, the operating system 516 can be run on one or more cloud machine instances In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A system for validating fuel payment at a fuel point of sale terminal, the system comprising:
   a fuel point of sale terminal programmed to:
   receive a phone number and a unique security PIN from an individual, and transmit a request for validation of the phone number and the unique security PIN; and
   one or more computing devices storing program instructions and communicatively coupled to the fuel point of sale terminal and having one or more processors that when executed causes the one or more processors to perform the steps of:
   transmitting the unique security PIN associated with the phone number to an electronic device associated with the individual;
   receiving validation of the phone number and unique security PIN;
   issuing a command to cause the dispensing of the fuel to the individual in response to validation of the phone number and unique security PIN;
   requesting payment of a fuel purchase from a phone service provider associated with the phone number after a dispensing of fuel to the individual;
   receiving an indication of payment of the fuel purchase from the phone service provider; and
   recording the phone number, a fuel point of sale terminal identification number, and a time stamp for the fuel purchase.

2. The system of claim 1, wherein the one or more processors is further programmed to encrypt the unique security PIN prior to transmitting the unique security PIN to the electronic device associated with the individual.

3. The system of claim 1, wherein the unique security PIN is a temporary software token configured to expire after a predetermined time period.

4. The system of claim 1, wherein the phone number and the unique security PIN are received at the fuel point of sale terminal via a keypad.

5. The system of claim 1, wherein the fuel point of sale terminal includes a graphical user interface configured to receive the phone number and the unique security PIN.

6. A method of validating fuel payment at a fuel point of sale terminal, the method comprising:
   transmitting from a computing device a unique security PIN associated with a phone number to an electronic device associated with an individual;
   receiving, at a fuel point of sale terminal, the phone number from the individual;
   receiving, at the fuel point of sale terminal, the unique security PIN from the individual;
   transmitting, from the fuel point of sale terminal, a request for validation of the phone number and unique security PIN;
   receiving, at the computing device, validation of the phone number and unique security PIN;
   issuing, from the computing device, a command that signal the dispensing of the fuel to the individual at the fuel point of sale terminal in response to validation of the phone number and unique security PIN;
   requesting, from the computing device, payment of the fuel purchase from a phone service provider associated with the phone number after dispensing fuel to the individual;
   receiving at the computing device an indication of payment of the fuel purchase from the phone service provider; and
   recording, via the computing device into a database, the phone number, a fuel point of sale terminal identification number, and a time stamp for the fuel purchase.

7. The method of claim 6, further comprising encrypting the unique security PIN prior to transmitting the unique security PIN to the electronic device associated with the individual.

8. The method of claim 6, wherein the unique security PIN is a temporary software token configured to expire after a predetermined time period.

9. The method of claim 6, wherein the unique security PIN is received at the fuel point of sale terminal via a keypad.

10. The method of claim 6, wherein the fuel point of sale terminal includes a graphical user interface configured to receive the phone number and the unique security PIN.

* * * * *